(12) United States Patent
Adams et al.

(10) Patent No.: US 9,195,440 B2
(45) Date of Patent: Nov. 24, 2015

(54) INTELLIGENT DATA SOURCE SELECTION IN APPLICATION DEVELOPMENT

(71) Applicant: International Business Machines Corporation, Armonk, NY (US)

(72) Inventors: Samuel Scott Adams, Rutherfordton, NC (US); Rosalind Toy Allen Radcliffe, Durham, NC (US); Elizabeth Vera Woodward, Cedar Park, TX (US); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 14/091,241

(22) Filed: Nov. 26, 2013

(65) Prior Publication Data

US 2015/0149981 A1  May 28, 2015

(51) Int. Cl.
  *G06F 9/44*  (2006.01)
(52) U.S. Cl.
  CPC ........................................ *G06F 8/36* (2013.01)
(58) Field of Classification Search
  None
  See application file for complete search history.

(56) References Cited

U.S. PATENT DOCUMENTS

| | | | | |
|---|---|---|---|---|
| 6,427,228 | B1* | 7/2002 | Wigger | 717/111 |
| 7,007,266 | B1* | 2/2006 | Isaacson | 717/100 |
| 7,526,753 | B2* | 4/2009 | Spencer et al. | 717/109 |
| 7,676,795 | B2* | 3/2010 | Elnozahy | 717/128 |
| 7,774,757 | B1* | 8/2010 | Awasthi et al. | 717/127 |
| 7,926,032 | B2* | 4/2011 | Beisiegel et al. | 717/122 |
| 8,276,123 | B1* | 9/2012 | Deng et al. | 717/125 |
| 8,904,373 | B2* | 12/2014 | Gehani et al. | 717/168 |
| 2002/0056075 | A1* | 5/2002 | Hamilton et al. | 717/110 |
| 2003/0005048 | A1* | 1/2003 | Risalvato | 709/203 |
| 2003/0172368 | A1* | 9/2003 | Alumbaugh et al. | 717/106 |
| 2005/0004949 | A1* | 1/2005 | Trepess et al. | 707/104.1 |
| 2005/0091638 | A1* | 4/2005 | Bley | 717/111 |
| 2006/0080639 | A1* | 4/2006 | Bustelo et al. | 717/111 |

(Continued)

OTHER PUBLICATIONS

Bruch et al. Learning from examples to improve code completion systems. Proceedings of the the 7th joint meeting of the European software engineering conference and the ACM SIGSOFT symposium on the foundations of software engineering, 2009, pp. 213-222.

(Continued)

*Primary Examiner* — Don Wong
*Assistant Examiner* — Roberto E Luna
(74) *Attorney, Agent, or Firm* — Garg Law Firm, PLLC; Rakesh Garg; William J. Stock (57) ABSTRACT

A method, system, and computer program product for amorphous data preparation for intelligent data source selection in application development are provided in the illustrative embodiments. A set of keywords is selected from a code portion of a source code. Using a subset of the set of keywords, an expected circumstance is determined, the expected circumstance being a circumstance relevant to a purpose of the source code. From a set of data sources, a data source is identified, wherein the data source provides information usable in the expected circumstance. A manner of accessing the information from the data source is identified. Pseudo-code is constructed to implement the manner of accessing the information from the data source. A weight is assigned to the data source based upon a type of input used for selecting the pseudo-code, wherein the selecting uses the pseudo-code in the source code.

19 Claims, 5 Drawing Sheets

(56) References Cited

U.S. PATENT DOCUMENTS

| | | | |
|---|---|---|---|
| 2008/0134089 A1* | 6/2008 | Adachi et al. | 715/810 |
| 2008/0134161 A1* | 6/2008 | Chamieh et al. | 717/166 |
| 2008/0148163 A1* | 6/2008 | Charboneau et al. | 715/762 |
| 2010/0037204 A1* | 2/2010 | Lin et al. | 717/106 |
| 2010/0107141 A1 | 4/2010 | Fitzmaurice et al. | |
| 2012/0124547 A1 | 5/2012 | Halbedel | |
| 2012/0159441 A1 | 6/2012 | Ghaisas | |
| 2012/0179587 A1* | 7/2012 | Hill et al. | 705/34 |
| 2013/0212562 A1 | 8/2013 | Fox et al. | |
| 2014/0317641 A1* | 10/2014 | Trofin et al. | 719/328 |
| 2014/0359558 A1* | 12/2014 | Chamberlain | 717/105 |

OTHER PUBLICATIONS

McFadden et al. Automating Context-aware Application Development. http://henricksen.id.au/publications/UbiCompWorkshop04-2.pdf, 2004.

Nguyen et al. Graph-Based Pattern-Oriented, Context-Sensitive Source Code Completion. Proceedings of the 2012 International Conference on Software Engineering, 2012, pp. 69-79.

Ou et al. A Model Driven Integration Architecture for Ontology-Based Context Modelling and Context-Aware Application Development. Model Driven Architecture—Foundations and Applications, Lecture Notes in Computer Science vol. 4066, 2006, pp. 188-197.

Bani-Salameh et al; SCI: Social Collaborative Integrated Development Environment, http://www.mendeley.com/research/sci-towards-social-collaborative-integrated-development-environment/, vol. 4, 2009 International Conference on Computational Science and Engineering (2009).

IBM, IBM Cognos Collaboration, © Copyright IBM Corporation 2010.

Wikipedia, Context-sensitive help, http://en.wikipedia.org/wiki/Context-sensitive_help, Mar. 2013.

Computerworld, IBM Rational lists 20 products supporting new Jazz technology, http://www.computerworld.com/s/article/9091758/IBM_Rational_lists_20_products_supporting_new_Jazz_technology, Copyright © 1994-2013.

Developerworks, RTC 3.0: Context-Aware Search for source code using semantic analysis of related artifacts, https://www.ibm.com/developerworks/community/blogs/nfrsblog/entry/rtc_3_0_context_aware_search_for_source_code_using_semantic_analysis_of_related_artifacts1?lang=en, Dec. 21, 2013.

* cited by examiner

| RELATED WORDS 404 | EXPECTED CIRCUMSTANCES 406 | DATA SOURCES 408 | INFORMATION NEEDED TO ACCESS THE DATA SOURCES 410 | SAMPLE CODE 412 |
|---|---|---|---|---|
| RESTAURANT, FOOD, EAT, EATING? ESTABLISHMENT | MENU | ALLMENUS.COM MCDONALDS.COM | RESTAURANT NAME, ADDRESS | Http://www.allmenus.com/ <r.name><r.addr> |
| RESTAURANT, FOOD, EAT, EATING? ESTABLISHMENT | ACCESSIBILITY | ACCESSIBLELOCATIONS.ORG /ACCESSDB | ZIP | Where ADA compliance=y, and zip=<r.zip> |
| RESTAURANT, FOOD, EAT, EATING? ESTABLISHMENT | REVIEWS | RESTAURANTREVIEWS.COM | RESTAURANT NAME, ADDRESS | Cloud/public/restaurantreviews/ <r.name>/<r.addr> |
| RESTAURANT, FOOD, EAT, EATING? ESTABLISHMENT | LOCATION SAFETY | US -> CRIMERATESITE.COM | ADDRESS | Getsafetyrecord(r.addr) |

402

414
416
418
420

INTELLIGENT DATA SOURCE SELECTION IN APPLICATION DEVELOPMENT

TECHNICAL FIELD

The present invention relates generally to a method, system, and computer program product for enhancing an application development environment. More particularly, the present invention relates to a method, system, and computer program product for intelligent data source selection in application development.

BACKGROUND

An application development environment is a tool or software usable to develop the source code of other software applications. Typically, an application development process uses a specification to implement the various features of the application.

People, things, businesses, functions, operations, relationships, needs, problems, and history are some purposes for which software developers develop a variety of software applications. An enormous amount of information concerning various purposes is available from a vast number of data sources. In 2011 alone, an estimated 1.8 zettabytes (or 1.8 trillion gigabytes) of data was created, the equivalent to every U.S. citizen writing 3 tweets per minute for 26,976 years. Furthermore, the information and the data sources are ever-changing, with more, new, or different information, in more, new, or different forms, becoming available from existing and new data sources every day.

SUMMARY

The illustrative embodiments provide a method, system, and computer program product for intelligent data source selection in application development. An embodiment includes a method for intelligent data source selection in application development. The embodiment selects a set of keywords from a code portion, the code portion being a part of a source code, the source code being modified in an application development tool. The embodiment determines, using a subset of the set of keywords, an expected circumstance, the expected circumstance being a circumstance relevant to a purpose of the source code. The embodiment identifies, from a set of data sources, a data source, wherein the data source provides information usable in the expected circumstance. The embodiment determines a manner of accessing the information from the data source. The embodiment constructs pseudo-code to implement the manner of accessing the information from the data source. The embodiment assigns a weight to the data source based upon a type of input used for selecting the pseudo-code, wherein the selecting uses the pseudo-code in the source code.

Another embodiment includes a computer usable program product comprising a computer usable storage device including computer usable code for intelligent data source selection in application development. The embodiment further includes computer usable code for selecting a set of keywords from a code portion, the code portion being a part of a source code, the source code being modified in an application development tool. The embodiment further includes computer usable code for determining, using a subset of the set of keywords, an expected circumstance, the expected circumstance being a circumstance relevant to a purpose of the source code. The embodiment further includes computer usable code for identifying, from a set of data sources, a data source, wherein the data source provides information usable in the expected circumstance. The embodiment further includes computer usable code for determining a manner of accessing the information from the data source. The embodiment further includes computer usable code for constructing pseudo-code to implement the manner of accessing the information from the data source. The embodiment further includes computer usable code for assigning a weight to the data source based upon a type of input used for selecting the pseudo-code, wherein the selecting uses the pseudo-code in the source code.

Another embodiment includes a data processing system for intelligent data source selection in application development. The embodiment further includes a storage device including a storage medium, wherein the storage device stores computer usable program code. The embodiment further includes a processor, wherein the processor executes the computer usable program code. The embodiment further includes computer usable code for selecting a set of keywords from a code portion, the code portion being a part of a source code, the source code being modified in an application development tool. The embodiment further includes computer usable code for determining, using a subset of the set of keywords, an expected circumstance, the expected circumstance being a circumstance relevant to a purpose of the source code. The embodiment further includes computer usable code for identifying, from a set of data sources, a data source, wherein the data source provides information usable in the expected circumstance. The embodiment further includes computer usable code for determining a manner of accessing the information from the data source. The embodiment further includes computer usable code for constructing pseudo-code to implement the manner of accessing the information from the data source. The embodiment further includes computer usable code for assigning a weight to the data source based upon a type of input used for selecting the pseudo-code, wherein the selecting uses the pseudo-code in the source code.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that in addition to the specification for the application being developed, an application development process can benefit from the information available from a variety of data sources. The illustrative embodiments further recognize that with the ever-changing collection of data sources, and with the volume of information available from such data sources, locating usable information is a non-trivial task.

Missed data-use opportunities are a consequence of the increasing volume of available information and the change in data sources from where the information is available. The illustrative embodiments recognize that as a consequence of missed data-use opportunities, applications are being developed with less capabilities, fewer features, and sub-optimal built-in intelligence than is possible from the available information. The illustrative embodiments also recognize that simply searching for information, such as by using a search engine on the internet, is not an effective way for integrating the available information into the application development process.

The illustrative embodiments used to describe the invention generally address and solve the above-described problems and other problems related to using a variety of data sources in application development. The illustrative embodiments provide a method, system, and computer program product for intelligent data source selection in application development.

An embodiment detects application development activity in an application development environment. Depending on what part of code is being worked on during the activity, an embodiment identifies a set of keywords. The keywords can include words or phrases that directly appear in the code, are suggestive of concepts identified in the code, are related to words phrases or concepts in the code, or are helpful in some manner in the purpose associated with the words phrases or concepts in the code. For example, if the code being worked on in the application development environment includes a call to a function that includes the word "restaurant" in the function name, an embodiment determines that the code portion somehow pertains to a circumstance of the restaurant business, a restaurateur role, a restaurant-going patron, or an experience involving operating or visiting a restaurant.

An embodiment identifies a set of data sources that are capable of providing some information about the circumstance being coded. In one embodiment, the set of data sources itself is a subset selected from a broader set of data sources that are approved, preferred, ranked, pre-qualified, short-listed, or otherwise selected for use in an application development process.

A common search using a search engine is limited to finding and presenting content that is relevant to a search term, e.g., a keyword. In contrast, an embodiment determines what purpose, or expected circumstance, in the application development can be addressed by a data source, what information related to that circumstance the data source can contribute to the application development process, and how the data source is to be accessed to extract that information in a form that is usable in application development. An embodiment further generates code or pseudo code that is usable for accessing the data source, extracting the information related to the circumstance, and combining in the code being developed in the application development environment.

An embodiment presents to a user several possible purposes or expected circumstances, corresponding subsets of data sources, manner of accessing relevant information from the subset of data sources, and code for implementing that manner of accessing. An embodiment presents these artifacts as options for a user to consider during the application development process. An embodiment further allows the user, such as an application developer, to select from the various options. The embodiment accepts a selection input from the user, whereby the user selects one or more of the several options presented.

The selection input received by the embodiment has an associated type. For example, the user may select an option by copying the code corresponding to that option, or checking a checkbox for that option. The selection input can also have an order. For example, the user may check more than one checkboxes in a particular order. The type and order of the selection inputs are indicative of an importance attributed to the data source of the selected option(s). Accordingly, an embodiment attributes a priority or weight to the selected data source(s) according to the type, order, or both, of the input that selects those data source(s).

Application development is an iterative process. Often the same code portion is developed and re-developed, refined, corrected, improved, or modified in several iterations before the code portion is deemed acceptable. Application development is also a repetitive process. The code development process used in one code section is often repeatable in another code section at a different time. Accordingly, an embodiment uses the priority or weight associated with the data sources for selecting the data sources that can participate in an expected circumstance. For example, suppose that a data source was used for providing information relevant to an expected circumstance before. Further suppose that the user had copied and pasted the generated code to access that data source at that time. When a similar circumstance is expected again in the same or different code portion later, an embodiment preferentially reuses the data source according to the data source's priority or weight, to provide similar information in a similar manner using similar code.

The illustrative embodiments are described with respect to certain purposes, circumstances, code or pseudo-code, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
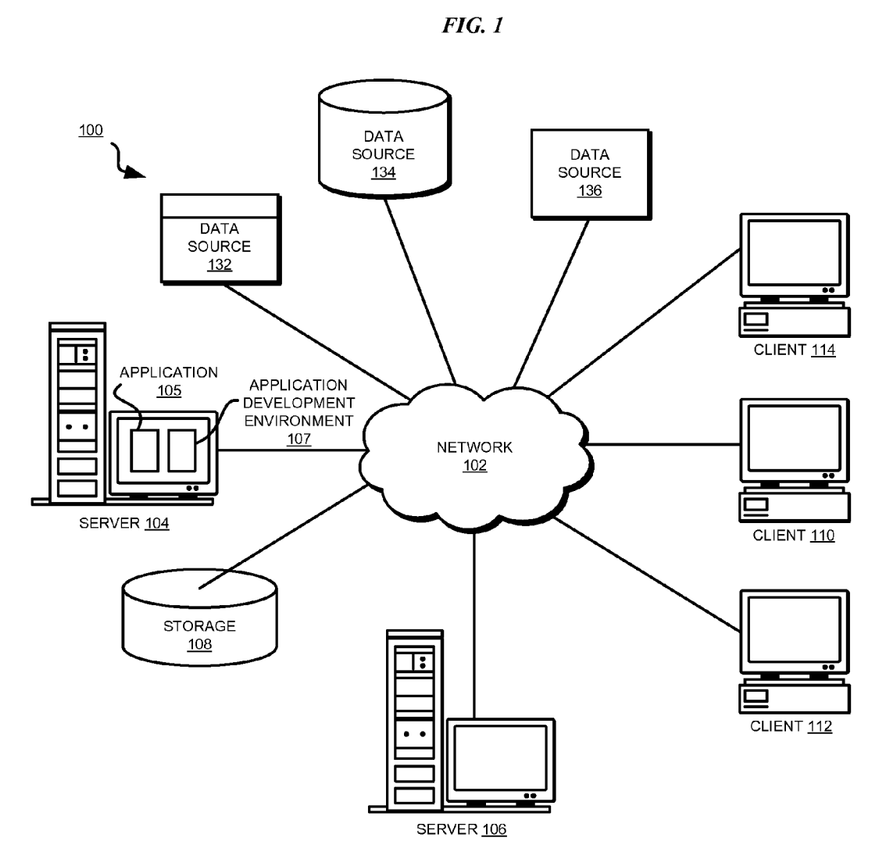
FIG. 1 depicts a pictorial representation of a network of data processing systems in which illustrative embodiments may be implemented.
Figure 2:
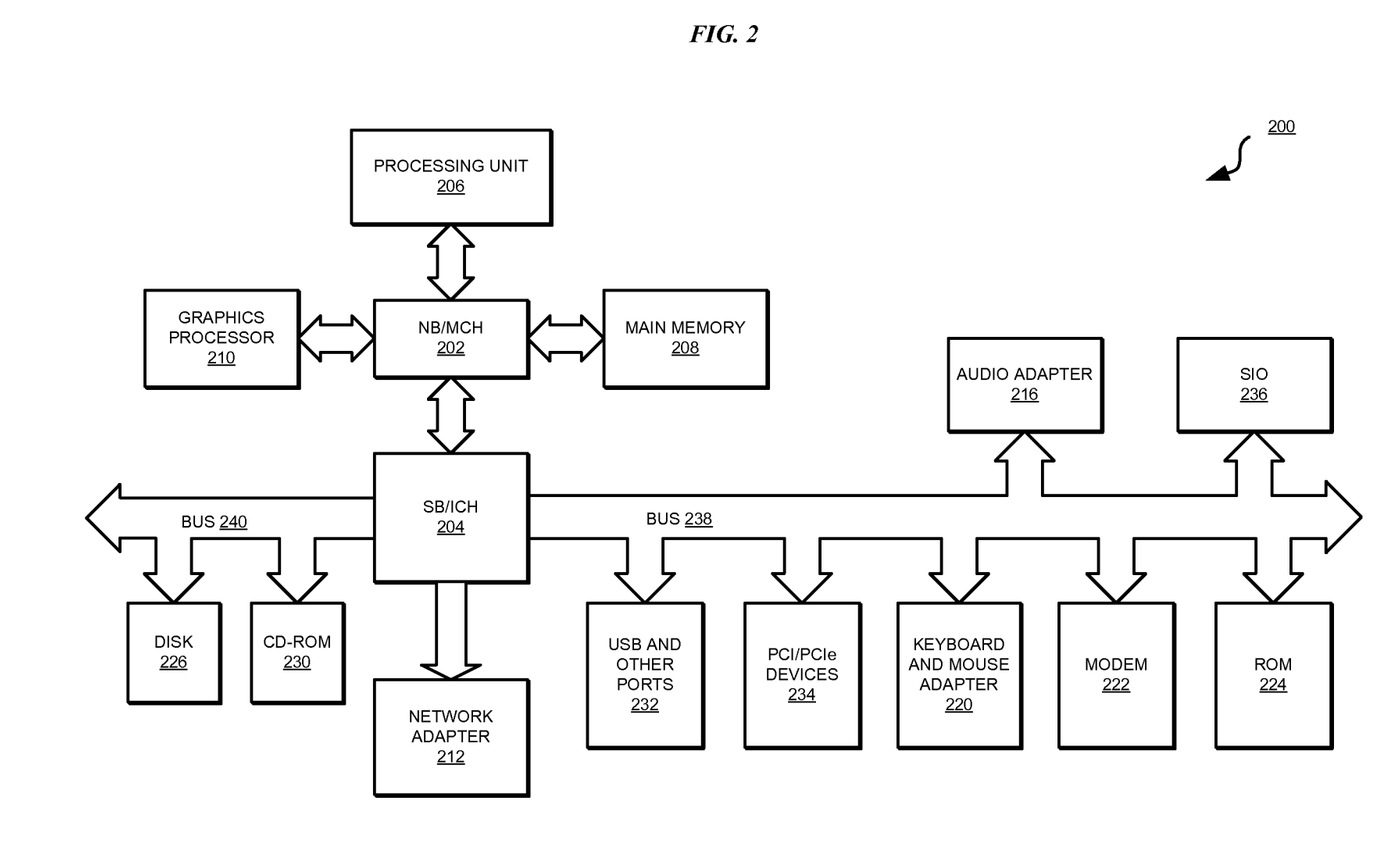
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. Servers 104 and 106, and clients 110, 112, 114, are depicted as servers and clients only as example. Data processing systems 104, 106, 110, 112, and 114 also represent example nodes in a cluster, partitions, and other configurations suitable for implementing an embodiment. For example, server 104 includes application 105, which implements an embodiment described herein. Application development environment 107 is a tool for software development. Within the scope of the illustrative embodiments, an existing Application development environment 107 can be modified to include the features of application 105, or an existing application development environment 107 can be configured to operate in conjunction with application 105. Data sources 132, 134, and 136 are each a data source capable of providing information relevant to an expected circumstance of application development in a code portion as described elsewhere in this disclosure. For example, data source 132 can be a website or web-accessible site; data source 134 can be a database, file-system, or another type of information repository; and data source 136 can be an information service, such as a service accessible via an application programming interface (API).

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and application development environment 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA) or another mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
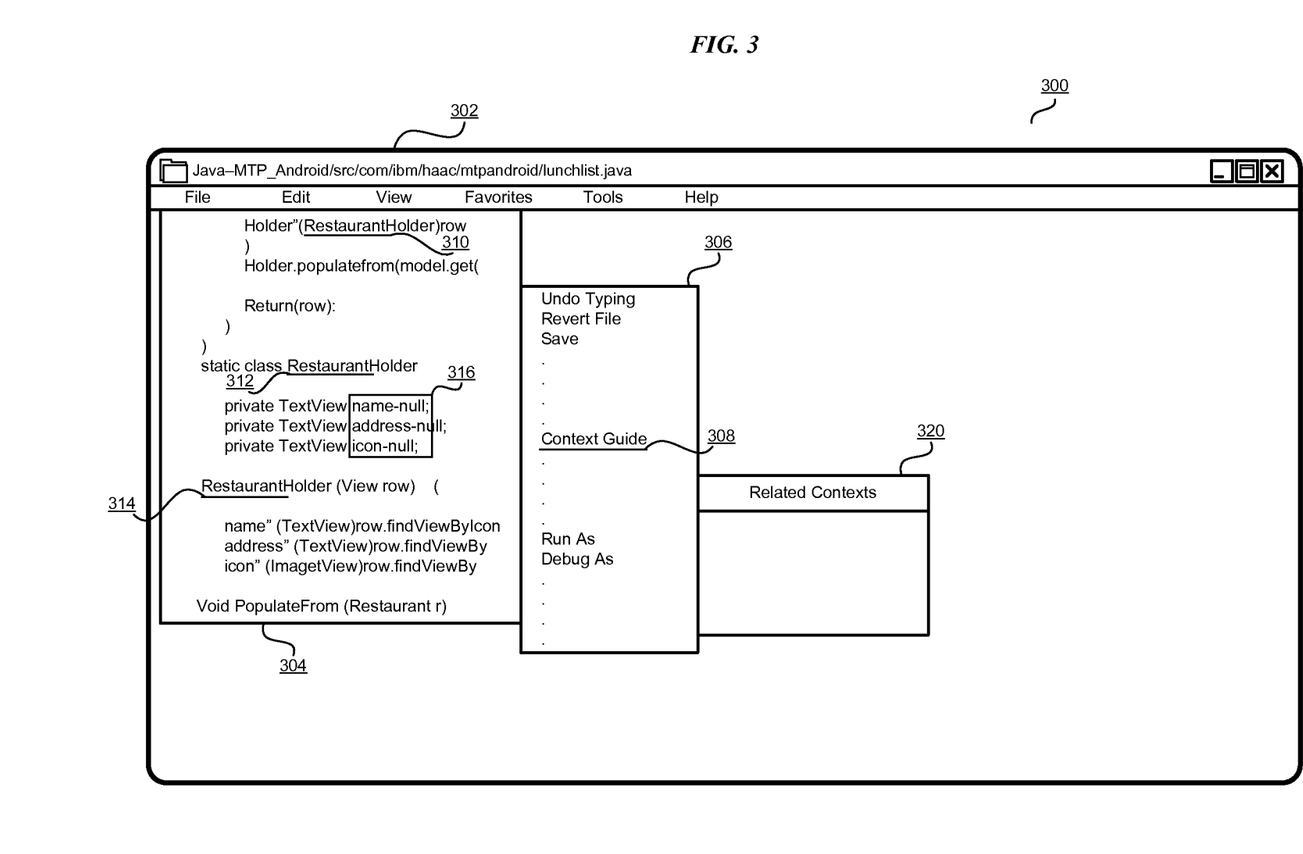
FIG. 3 depicts an example configuration for intelligent data source selection in application development in accordance with an illustrative embodiment.

With reference to FIG. 3, this figure depicts an example configuration for intelligent data source selection in application development in accordance with an illustrative embodiment. Configuration 300 can be implemented using application 105 and application development environment 107 in FIG. 1. An application development environment presents interface 302 within which code development activity in example area 304. Menu 306 offers a user a variety of selections useful in code development.

An application implementing an embodiment, such as application 105 in FIG. 1, provides additional features in interface 302. Only as an example, and without implying any limitation thereto, in one embodiment, the application provides the features usable for intelligent data source selection in application development in menu 306. For example, menu option 308, or a suitable equivalent feature in other application development environments, allows the user to activate an embodiment to provide contextual guidance for incorporating information from various data sources code development.

When the user selects menu option 308, the application analyzes the code portion currently being worked on in area 304. The application identifies words, phrases, or concepts from the code section in area 304. In one embodiment, if the code section in area 304 references other code that is not presently in area 304, such as a reference to a library or an included code in another file, the application analyzes that other code as well in a similar manner.

For example, code lines 310, 312, and 314 include the word "restaurant" suggesting that the code in area 304 pertains to purposes in a restaurant environment. Code block 316 contains words that suggest a circumstance related to a location of a restaurant. Accordingly, the application determines that the code in area 304 also pertains to some purpose specifically related to a location of a restaurant.

Accordingly, the application determines a set of expected circumstances that the code in area 304 is being developed to address. Some example expected circumstances related to purposes of a restaurant include, but are not limited to, menu information at certain restaurant locations, accessibility of certain restaurant locations, reviews of certain restaurant locations, and safety concerns of certain restaurant locations. The application can identify an expected circumstance from the words, phrases, or concepts discovered in the code with the help of a lexicon, ontology, or a knowledgebase in any suitable form.

The application presents some or all of the expected circumstances in area 320. In one embodiment, area 320 can be a dynamically generated submenu as shown. In another embodiment, area 320 can be sub-panel (not shown) in interface 302. In another embodiment, area 320 can be separate from interface 302.

Figure 4:
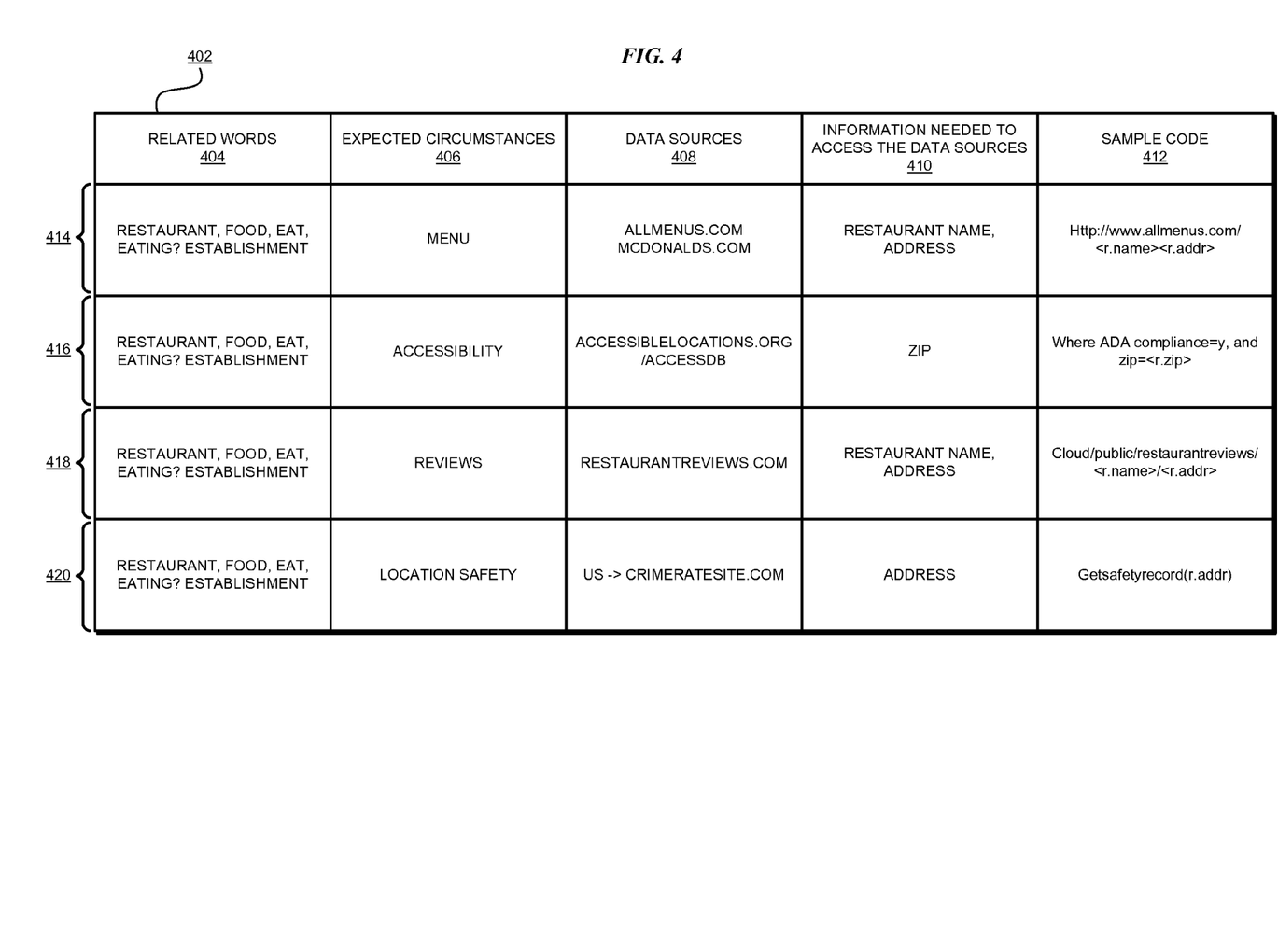
FIG. 4 depicts an example manner of presenting options for intelligent data source selection in application development in accordance with an illustrative embodiment.

With reference to FIG. 4, this figure depicts an example manner of presenting options for intelligent data source selection in application development in accordance with an illustrative embodiment. Table 402 is an example way of presenting the options of various contextual information from various data sources in response to a user selecting menu selection 308 in FIG. 3. In one embodiment, table 402 is presented in area 320 or another area in interface 302 in FIG. 3.

Only as an example, table 402 depicts some example columns to organize the contextual information. Column 404 lists words, phrases, or concept discovered in a code portion, such as from code lines 310, 312, and 314, and code block 316 in FIG. 3. In one embodiment, column 404 also lists synonyms, related concepts, related or helpful words, words or phrases suggestive of similar concepts, and many other variations of the actual findings in the code portion.

Column 406 lists one or more expected circumstances for the listings in each row under column 404. Column 408 lists one or more data sources capable of providing information relevant to an expected circumstance, given the listings in column 404.

Column 410 identifies the information needed to access the data sources of column 408. For example, a data source may be capable of providing menus for several restaurant locations, but in order to provide the menu information for a restaurant, the data source needs the restaurant's name and address.

Column 412 provides sample code or pseudo code for using a data source listed in column 408. The code in column 412 can take any suitable form depending on the type of data source, manner of accessing the data source, protocol used, parameters expected, and many other factors. Some example forms of code under column 412 can be a uniform resource locator (URL), a database query, an API call, or a file-system path. Code under column 412 can also be multi-step code block within the scope of the illustrative embodiments. For example, a database query may not be executed without first connecting to the database with proper authentication. Accordingly, the code in column 412 may includes code to connect, followed by code to authenticate, and then the code for the query.

As an example, row 414 depicts a set of words under column 404, which include not only the word "restaurant" identified in code lines 310, 312, and 314, but also other related words, such as "food" and "eating establishment", for identifying one or more expected circumstance of using the word restaurant in code. For example, row 414 under column 406 lists "menu", to identify an expected circumstance that the code might be able to use a data source that provides menu information about a restaurant. In column 408, row 414 identifies a set of website sources that provide menus. Column 410 for row 414 identifies the parameters needed to get menu information about a particular restaurant from one or more of the website sources. Column 412 for row 414 (represented as (414,412)) provides a URL format that can be coded into code such that when the variable portions of the URL code are replaced with actual values during code execution, the URL will fetch the menu of the an actual restaurant location.

Row 416, column 410 similarly lists a different set of parameters for a different set of data sources (416, 408) for a different expected circumstance (416,406). As an example, data source (416,408) is a database, and code (416,412) is a query pseudo code, which when populated with actual values are runtime will fetch a record of an actual restaurant from the database.

Row 418, column 410 similarly lists a different set of parameters for a different set of data sources (418, 408) for a different expected circumstance (418,406). As an example, data source (418,408) is a web accessible file-system drive, and code (416,412) is a pseudo file-path, which when populated with actual values are runtime will fetch a file of an actual restaurant from the drive. As an example, data source (420,408) is a web service, and code (416,412) is a call structure for an API of the web service, whose parameters when populated with actual values are runtime will return a result of an actual restaurant from the drive.

In one embodiment, the code or pseudo-codes in column 412 is available from a data source or another location. In another embodiment, an embodiment generates the code based on the information provided by a data source and by using a code generation application.

The example forms of data sources, the example code and pseudo-codes, the example parameters, and the example words and circumstances are not intended to be limiting on the illustrative embodiments. From this disclosure, those of ordinary skill in the art will be able to conceive many other forms of these and other similarly purposed artifacts, and the same are contemplated within the scope of the illustrative embodiments.

Figure 5:
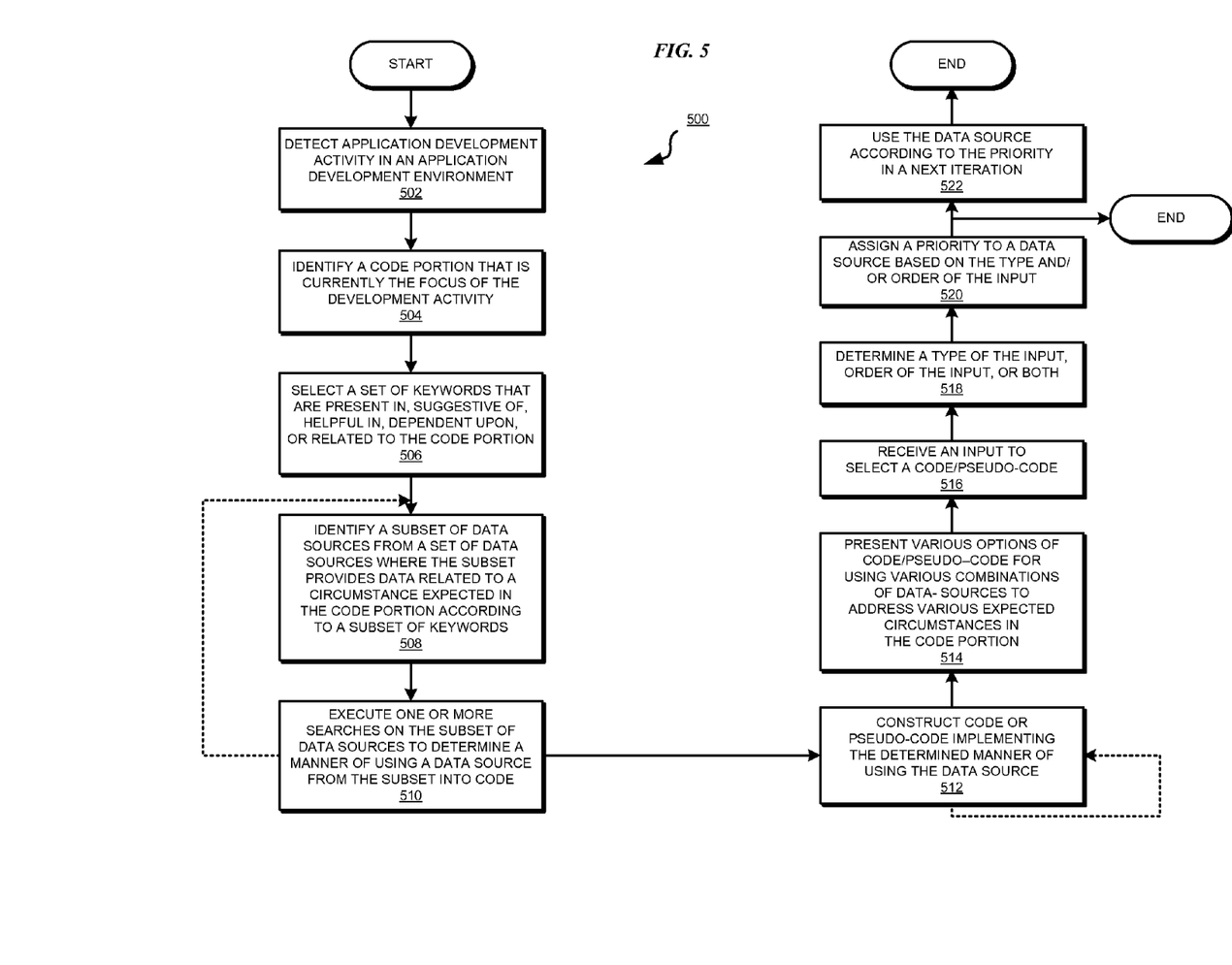
FIG. 5 depicts a flowchart of an example process of intelligent data source selection in application development in accordance with an illustrative embodiment.

With reference to FIG. 5, this figure depicts a flowchart of an example process of intelligent data source selection in application development in accordance with an illustrative embodiment. Process 500 can be implemented in application 105 in FIG. 1.

The application detects application development activity in an application development environment (block 502). The application identifies a code portion that is currently the focus of the application development activity (block 504).

The application selects a set of keywords (block 506). The selected set of keywords includes words, phrases, or concepts present in the code portion, or are suggestive of, helpful in, dependent upon, or related to the words phrases or concepts present in the code portion. The application identifies a subset of data sources from a set of data sources where the subset of data sources provides data related to a circumstance expected in the code portion according to a subset of keywords (block 508).

The application executes one or more searches on the subset of data sources to determine a manner of using a data source from the subset (block 510). For example, a search in block 510 may be configured to determine a protocol, a sequence of commands, a set of parameters, a format of a call, or other similarly purposed artifacts for using a data source. The application may repeat blocks 508 and 510 for any number of subsets of keywords, and any number of subsets of data sources as may be applicable in a given implementation.

The application constructs code or pseudo-code implementing the determined manner of using the data source (block 512). In one embodiment, the application gets the code in block 512 from the data source. In another embodiment, the application constructs the code in block 512 using a code generation tool.

The application presents various options of code or pseudo-code, for using various data sources, to address various expected circumstances in the code portion (block 514). The application receives an input to select a code or pseudo-code (block 516). The application determines a type of the input, an order of the input, or both (block 518). The application assigns a priority or weight to the data source of the selected option, based on the type and/or order of the input that selects the option (block 520). The application may end process 500 thereafter.

In one embodiment, during another iteration of application development, using the priority or weight assigned in block 520, the application increases or decreases the priority of the data source for intelligent data source selection in another iteration of application development (block 522). The application ends process 500 thereafter. In one embodiment, in block 522, the application may use the data source with a changed priority with the same code portion as identified in block 504. In another embodiment, in block 522, the application may use the data source with a changed priority with a code portion that is different from the code portion identified in block 504.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for intelligent data source selection in application development As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for intelligent data source selection in application development, the method comprising:
selecting a set of keywords from a code portion, the code portion being a part of a source code, the source code being modified in an application development tool;
determining, using a subset of the set of keywords, an expected circumstance, the expected circumstance being a circumstance relevant to a purpose of the source code;
identifying, from a set of data sources, a data source, wherein the data source provides information usable in the expected circumstance;
determining a manner of accessing the information from the data source;
constructing pseudo-code to implement the manner of accessing the information from the data source; and
assigning a weight to the data source based upon a type of input used for selecting the pseudocode, wherein the selecting uses the pseudo-code in the source code by:
executing a code block corresponding to the pseudo-code when the source code is executed;
providing runtime values to a set of parameters in the code block, the set of parameters being identified in the pseudo-code; and
receiving, from the data source, responsive to the providing the runtime values, data corresponding to the runtime values.

2. The method of claim 1, further comprising: presenting a plurality of options for improving the source code by using information from the set of data sources, an option in the plurality of options comprising the data source, the manner of accessing the data source, and the pseudo-code;
receiving the input, the input selecting the option from the plurality of options and thereby selecting the pseudo-code.

3. The method of claim 1, wherein the input comprise a copy operation, wherein the copy operation copies the pseudo-code, wherein the input comprise a paste operation, wherein the paste operation pastes the pseudo-code into the source code.

4. The method of claim 1, further comprising: identifying, during modifying a second code portion, the data source with a priority corresponding to the weight.

5. The method of claim 1, further comprising: identifying, in another iteration of modifying the code portion, the data source with a priority corresponding to the weight.

6. The method of claim 1, wherein the set of keywords comprises a word indicative of a concept, the concept identified in the code portion, wherein the word is absent in the code portion.

7. The method of claim 1, wherein the set of keywords comprises a first word, wherein the first word is related to a second word found in the code portion, wherein the first word is absent in the code portion.

8. The method of claim 1, further comprising: determining, from the code portion, a purpose addressed by the source code; and
determining, using a knowledgebase, the expected circumstance from the purpose.

9. The method of claim 1, wherein the manner of accessing comprises a protocol usable to access the data source.

10. The method of claim 1, wherein the manner of accessing comprises a set of parameters needed to access the data source.

11. The method of claim 1, wherein the manner of accessing comprises a function call to access the data source.

12. The method of claim 1, further comprising: receiving from the data source a specification of the manner of accessing the information.

13. The method of claim 1, wherein the pseudo-code is a code block usable in the source code.

14. A computer usable program product comprising a computer usable storage device including computer usable code for intelligent data source selection in application development, the computer usable code comprising:
computer usable code for selecting a set of keywords from a code portion, the code portion being a part of a source code, the source code being modified in an application development tool;
computer usable code for determining, using a subset of the set of keywords, an expected circumstance, the expected circumstance being a circumstance relevant to a purpose of the source code;
computer usable code for identifying, from a set of data sources, a data source, wherein the data source provides information usable in the expected circumstance;
computer usable code for determining a manner of accessing the information from the data source;
computer usable code for constructing pseudo-code to implement the manner of accessing the information from the data source; and
computer usable code for assigning a weight to the data source based upon a type of input used for selecting the pseudo-code, wherein the selecting uses the pseudo-code in the source code by including:
computer usable code for executing a code block corresponding to the pseudocode when the source code is executed;
computer usable code for providing runtime values to a set of parameters in the code block, the set of parameters being identified in the pseudo-code; and
computer usable code for receiving, from the data source, responsive to the providing the runtime values, data corresponding to the runtime values.

15. The computer usable program product of claim 14, further comprising: computer usable code for presenting a plurality of options for improving the source code by using information from the set of data sources, an option in the plurality of options comprising the data source, the manner of accessing the data source, and the pseudo-code;
computer usable code for receiving the input, the input selecting the option from the plurality of options and thereby selecting the pseudo-code.

16. The computer usable program product of claim 14, wherein the input comprise a copy operation, wherein the copy operation copies the pseudo-code, wherein the input comprise a paste operation, wherein the paste operation pastes the pseudo-code into the source code.

17. The computer usable program product of claim 14, wherein the computer usable code is stored in a computer readable storage medium in a data processing system, and wherein the computer usable code is transferred over a network from a remote data processing system.

18. The computer usable program product of claim 14, wherein the computer usable code is stored in a computer readable storage medium in a server data processing system, and wherein the computer usable code is downloaded over a network to a remote data processing system for use in a computer readable storage medium associated with the remote data processing system.

19. A data processing system for intelligent data source selection in application development, the data processing system comprising:
 a storage device including a storage medium, wherein the storage device stores computer usable program code; and
 a processor, wherein the processor executes the computer usable program code, and wherein the computer usable program code comprises:
 computer usable code for selecting a set of keywords from a code portion, the code portion being a part of a source code, the source code being modified in an application development tool;
 computer usable code for determining, using a subset of the set of keywords, an expected circumstance, the expected circumstance being a circumstance relevant to a purpose of the source code;
 computer usable code for identifying, from a set of data sources, a data source, wherein the data source provides information usable in the expected circumstance;
 computer usable code for determining a manner of accessing the information from the data source;
 computer usable code for constructing pseudo-code to implement the manner of accessing the information from the data source; and
 computer usable code for assigning a weight to the data source based upon a type of input used for selecting the pseudo-code, wherein the selecting uses the pseudo-code in the source code by including:
 computer usable code for executing a code block corresponding to the pseudocode when the source code is executed;
 computer usable code for providing runtime values to a set of parameters in the code block, the set of parameters being identified in the pseudo-code; and
 computer usable code for receiving, from the data source, responsive to the providing the runtime values, data corresponding to the runtime values.

\* \* \* \* \*